Sept. 14, 1954  L. H. FLORA  2,689,027
CLASP OR CLIP FASTENER
Filed June 29, 1950
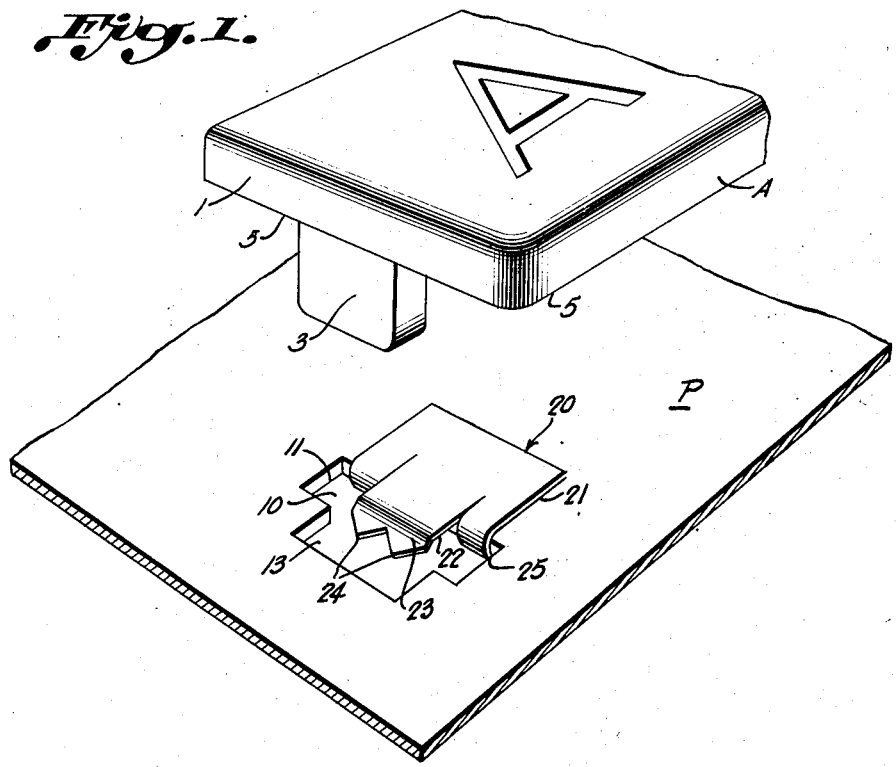
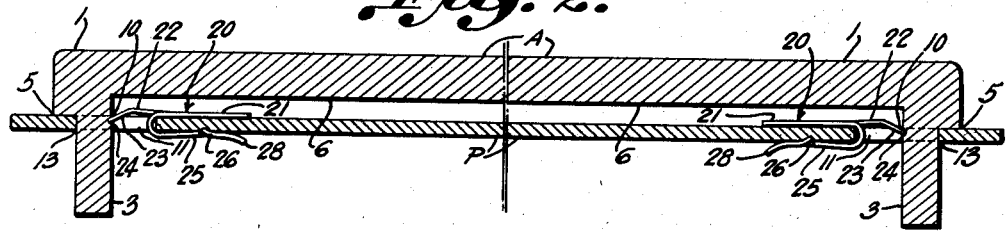
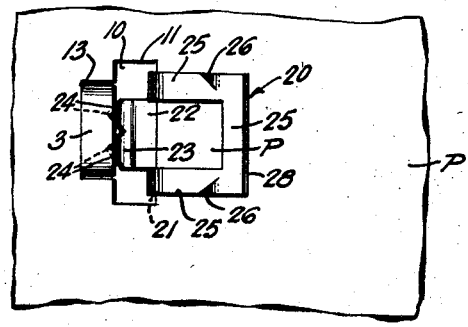
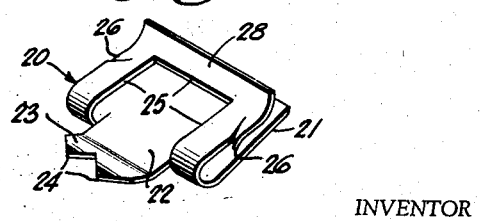
INVENTOR
LAURENCE H. FLORA
BY *H. J. Lombard*
ATTORNEY

Patented Sept. 14, 1954

2,689,027

UNITED STATES PATENT OFFICE 2,689,027

CLASP OR CLIP FASTENER

Laurence H. Flora, Cleveland, Ohio, assignor to Tinnerman Products, Inc., Cleveland, Ohio, a corporation of Ohio Application June 29, 1950, Serial No. 171,098

1 Claim. (Cl. 189—88)

This invention relates in general to improvements in clip fasteners and the like, and deals, more particularly, with an improved spring clip or clasp device for securing nameplates and similar articles to a wall or panel member by an operation taking place entirely from the outer or forward side of the panel or wall member as is required in a blind fastening installation, for example.

In many assemblies, it is often necessary or desirable for a nameplate or similar article to be mounted on a structure when completed or set up ready for use, and to this end, it is advantageous to provide a fastening means which is concealed and adapted to provide the desired mounting without requiring access to the interior of the structure, in what is known generally as a blind fastening installation. In such an arrangement, the spring clip is provided with attaching means serving to maintain the same in desired position on the supporting wall or panel in a completed assembly such that the operator may mount the nameplate or other article entirely from the outer or forward side of the assembly in a minimum of time and effort in completing the fastening installation.

A primary object of the invention is to provide a spring clip of this kind which is adapted to be easily and quickly attached in a panel opening by a simple clasping engagement with opposite faces of a marginal portion of the opening and which provides means for securing in such opening a stud, or the like, on the nameplate or other article to be mounted on the panel or wall member.

A further object of the invention is to provide such a spring clip and fastening arrangement in which the spring clip defines a locking tongue in the panel opening adapted for spring locking action with the stud on the nameplate or other article and further, with such locking tongue cooperating with an opposing marginal edge portion of the panel opening to secure the stud in a positive locking action under continuously effective spring tension.

Another object of the invention is to provide a spring clip of the kind described that may be inexpensively constructed as a simple sheet metal fastener having a clasp-type attaching means by which the clip is easily and quickly applied to attached fastening position in an opening in a panel or wall member and is self-retained in such fastening position against inadvertent disconnection or accidental removal without the use of extraneous bolts, screws, rivets, welding, or the like, preparatory to its use for securing the nameplate or other article in mounted position on the supporting wall or panel member.

A further object of the invention is to provide a fastening arrangement, as aforesaid, wherein the connecting stud associated with the nameplate or other article is applied to secured position by a simple, axial, thrust-like motion in which the spring clip has an automatic fastening engagement with the connecting stud that locks the connecting stud positively against loosening or reverse axial movement in a firm, rigid and tightly secured mounting of the nameplate or other article on the supporting panel or wall member.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a perspective view of a portion of a nameplate or other article having a connecting stud adapted to be received in an opening in a panel or wall member provided with an attaching device in accordance with the invention;

Fig. 2 is a sectional view showing the general arrangement in which a pair of spaced openings are prepared in the panel or wall member and provided with attaching devices for securing spaced studs on the nameplate or other article;

Fig. 3 is a bottom plan view of the left portion of Fig. 2 showing the connecting stud on the nameplate or other article as secured in the panel opening by the attaching device of the invention; and, Fig. 4 is a perspective view of the attaching device per se as seen from the underside thereof.

Referring now, more particularly, to the drawings, Figs. 1 and 2 illustrate the general arrangement by which a nameplate A or other article is adapted to be mounted onto an apertured panel or wall member P by an operation taking place entirely from the outer or forward side of said panel member P. The nameplate A or other article comprises a plate portion 1 of any selected shape and contour and provided with lettering or ornamental designs on the outer surface thereof as illustrated in Fig. 1, for example. The plate portion 1 is prepared with a pair of spaced similar connecting studs 3 projecting from the underside thereof, and these connecting studs 3 may be of any suitable cross section and provided on said plate portion 1 in any desired manner as by integral stud elements or separate stud elements screw threaded, riveted, or otherwise anchored to the underside of said plate portion 1. In the present example, the nameplate A or other article is prepared as one-piece molded plastic product or as a metal casting having such connecting studs 3 provided in a generally rectangular cross section and integrally formed on the underside of said plate 1 adjacent to a marginal flange 5 on the periphery of said plate 1. A central area 6 of reduced plate thickness, Fig. 2, is provided on the underside of said plate 1 inwardly of said connecting studs 3. This reduced plate area 6 provides for suitable clearance on the underside of the nameplate A from the spring clips 20 which secure the connecting studs 3 on the nameplate so that the peripheral flange 5 of the nameplate is adapted to seat in flush abutting engagement with the panel or wall member P in the mounted position of the nameplate or other article, as presently to be described.

The supporting panel or wall member P, may be of any suitable metal, wood, or fibre board construction, but usually is in the form of a metallic plate or panel member such as is employed in various cabinet structures, and the like. The supporting panel or wall member P is prepared with a pair of similar spaced openings 10, as best seen in Fig. 1, and each of these openings is designed for the attachment therein of a spring clip 20, and for receiving a connecting stud 3 on the nameplate or other article in providing the desired mounting thereof on said supporting panel or wall member P. The panel openings 10 have a suitable predetermined spacing and contour for receiving the spaced connecting studs 3 on the nameplate, or the like, to be secured by said spring clips 20; and inasmuch as said panel openings 10 and the spring clips 20 attached therein are similar in the present illustration, only one need be described in detail for a full understanding thereof.

As best seen in Figs. 1 and 3, each panel opening 10 comprises an assembling slot portion 11 merging into a stud passage 13 having a rectangular contour corresponding substantially to the rectangular cross section of the connecting stud 3 to be secured therein.

The spring clips, designated generally 20, may be constructed in any selected size and design in accordance with the shape and proportion of the parts and elements secured thereby, and preferably are provided from relatively small, inexpensive, substantially rectangular sections of sheet metal which may be severed from ordinary sheet metal strip stock without loss or waste of material whatsoever. Any suitable sheet metal may be employed but preferably that of a spring metal nature such as spring steel or cold rolled steel having spring characteristics and usually of a much greater tensile and compressive strength than the material of the panel or wall member P to which the spring clips are attached.

By suitable slitting, punching and bending operations, such a sheet metal section is formed into a generally U-shaped clip 20, comprising a pair of arms 21, 25, adapted to clasp the opposite faces of the panel or wall member P adjacent the slot portion 11 of the opening 10 therein. A tongue 22 carried by the arm 21, has its free end projecting outwardly from the bight of the U-shaped clip in the manner of an extension of said arm 21 lying in the same general plane. The tongue 22 preferably has its free end portion 23 bent slightly downwardly and the extremity thereof provided with sharp pointed teeth 24. The other arm 25 of the U-shaped clip 20 is provided with anchoring elements 26 as by angular slits along its side edges defining pointed prongs or barbs 26 which are bent to project inwardly into the space between said spaced arms 21, 25. Similar prongs may also be provided on the arm 21 and, if desired, other prongs or equivalent anchoring elements may be formed on either of said arms 21 or 25. The arm 25 preferably has its free end bent into an outwardly flared flange 28 which facilitates the initial application of the arms 21, 25, of the fastener over the edge of the panel P adjoining the assembling slot 11; likewise, the free end of the arm 21 may be flared outwardly in a similar manner for the same purpose, if desired.

Such a spring clip 20 is provided in a preferred construction from a simple rectangular section of sheet metal, one end 25 of which is stamped with a cutout and spaced parallel slits defining the tongue 22. The tongue 22 is provided with its free end portion 23 bent slightly downwardly and formed with the teeth 24 on the extremity thereof, together with the prongs 26 and outwardly flared flange 28 on the end of said arm 25. The cutout arm 25 of the strip is then bent into generally U-shaped relationship to the arm 21 and the tongue 22 carried thereby, to define the completed spring clip 20, in which said arms 21, 25, have a spacing less than the thickness of the panel P and must be spread apart in order to be applied to clasping engagement with an edge portion of said panel P.

With the panel or wall member P prepared with the spaced openings 10, corresponding to the spacing of the connecting studs 3 on the nameplate A or other part, a spring clip 20 is attached in each opening 10 as shown in Figs. 1 and 2. The spring clip 20 is easily and quickly attached entirely from the outer or forward side of panel P simply by inserting the free ends of the arms 21, 25, into the slot portion 11 of the opening 10 and spreading said arms 21, 25, apart over the inner marginal edge of said slot portion 11 as necessary for said arms to slide into clasping engagement with the panel P adjacent said slot portion 11. The spreading of the arms 21, 25, over the marginal edge of the panel P adjacent the slot 11 is facilitated by outward flared extremity 28 on the arm 25. The prongs or barbs 26 are so provided as to permit sliding of the spring clip to attached position where said prongs 26 are adapted to embed in the panel or wall member P and prevent reverse sliding or shifting of the spring clip 20 from attached position.

In such attached position, the tongue 22 carried by the arm 21 has its free end disposed adjacent the open side of the stud passage 13, Figs. 1 and 3, with the teeth 24 on the extremity thereof projecting into the area of such stud passage and inclined slightly inwardly therein in the direction in which the associated connecting stud 3 moves on being inserted into said stud passage 13.

A spring clip 20 is attached in each panel opening 10 in a similar manner whereupon the nameplate A is positioned over the panel P with the connecting studs 3 thereon in line with the associated stud passages 13 in said panel. A simple pressing or pushing force is then applied to the nameplate A in the area of said studs 3 to cause each stud to move axially into its stud passage 13 and engage the teeth 24 on the free end 23 of the tongue 22 of the spring clip at the open side of said stud passage. The inwardly inclined relation of the tongue extremity 23 in the stud passage 13 presents a funnel-like entrance which facilitates the initial insertion of the stud 3 into its stud passage, while said tongue 22 otherwise is adapted to flex slightly inwardly as the stud 3 is pushed home to a position in which the peripheral flange 5 of the nameplate A is seated in flush abutting engagement with the panel or wall member P as shown in Fig. 2. In this relation, the teeth 24 on the tongue extremity become effective to bite into and anchor in the adjacent surface of the connecting stud 3 to secure and lock the stud tightly against reverse axial movement and thereby retain the adjoining area of the nameplate A in applied mounted position. Each connecting stud 3 on the nameplate A or other article is secured in a similar manner by a spring clip 20 attached in its associated opening 10, as aforesaid, such that the entire nameplate A is firmly and rigidly secured on the panel or wall member P against loosening or displacement in its final mounted position.

The spring clip 20 preferably is constructed of relatively thin sheet metal the thickness of which is selected according to service requirements and the predetermined size of the parts to be secured. The spring clip is most effective when provided of spring metal suitably tempered and otherwise treated to give the desired toughness and hardness, particularly in the case of devices used in installations subject to extreme conditions of vibration, or the like. A cheap and highly effective spring clip may be provided from cold rolled metal such as cold rolled steel which is untempered but of a spring metal nature and capable of providing an effective and reliable securing device as and for the purposes described.

While the invention has been described in detail with a specific example, such example is intended as an illustration only inasmuch as various changes in the spring clip and the parts secured thereby may be provided without departing from the spirit and scope of the invention.

What is claimed is:

A fastening construction comprising a panel having an opening and a clip attached in said opening at one side of said opening, an article provided with a stud received in said opening in the panel between said clip and the other side of said opening, said clip comprising a sheet metal body defining a pair of parallel arms extending in the same general direction and clasping therebetween opposite surfaces of a marginal portion of the panel adjacent said one side of said opening, and a tongue carried by one of said arms of the clip extending in the opposite direction from said arms and projecting into the area of said opening, said tongue engaging one surface of said stud and said other side of said opening engaging the opposite surface of said stud in cooperation with said tongue thereby securing said stud in said opening in applied position, said parallel arms of said clip being of such length as to resist removal of said clip from engagement with said opposite surfaces of said panel upon said engagement of said stud in said applied position.

References Cited in the file of this patent

UNITED STATES PATENTS

| Number | Name | Date |
| --- | --- | --- |
| 610,807 | Grinsfelder | Sept. 13, 1898 |
| 1,863,381 | Orthwine | June 14, 1932 |
| 2,148,847 | Wiley | Feb. 28, 1939 |
| 2,148,848 | Wiley | Feb. 28, 1939 |
| 2,208,779 | Tinnerman | July 23, 1940 |
| 2,485,189 | Churchill | Oct. 18, 1949 |
| 2,562,002 | Tinnerman | July 24, 1951 |
| 2,616,142 | Tinnerman | Nov. 4, 1952 |